(12) United States Patent
Khokhar et al.

(10) Patent No.: US 9,420,032 B1
(45) Date of Patent: Aug. 16, 2016

(54) REMOTE DATA ACCESS PERMISSION USING REMOTE PREMISES MONITORING

(71) Applicants: Muzhar Khokhar, Shrewsbury, MA (US); Joseph Bet-Eivazi, Methuen, MA (US)

(72) Inventors: Muzhar Khokhar, Shrewsbury, MA (US); Joseph Bet-Eivazi, Methuen, MA (US)

( * ) Notice: Subject to any disclaimer, the term of this patent is extended or adjusted under 35 U.S.C. 154(b) by 0 days.

(21) Appl. No.: 14/195,674

(22) Filed: Mar. 3, 2014

(51) Int. Cl.
*H04L 29/06* (2006.01)
*H04L 29/08* (2006.01)

(52) U.S. Cl.
CPC .................................. *H04L 67/025* (2013.01)

(58) Field of Classification Search
CPC ............... G06F 17/30088; G06F 3/065
USPC ..................... 709/225, 226, 227, 228
See application file for complete search history.

(56) References Cited

U.S. PATENT DOCUMENTS

| | | | |
|---|---|---|---|
| 8,060,529 | B2 | 11/2011 | Hu et al. |
| 8,316,237 | B1 | 11/2012 | Felsher et al. |
| 9,171,198 | B1 * | 10/2015 | Raffle .................. G06K 9/00281 |
| 2002/0004902 | A1 | 1/2002 | Toh et al. |
| 2003/0018891 | A1 | 1/2003 | Hall et al. |
| 2008/0204702 | A1 * | 8/2008 | Gerth ....................... G01C 3/04 356/5.01 |
| 2008/0219658 | A1 * | 9/2008 | Keane ................. H04N 1/00244 396/429 |
| 2008/0240702 | A1 | 10/2008 | Wassingbo et al. |
| 2009/0017750 | A1 | 1/2009 | Marcinkiewicz |
| 2013/0238562 | A1 * | 9/2013 | Kumarasamy et al. ........ 707/649 |
| 2014/0033322 | A1 * | 1/2014 | Nair ......................... G06F 21/60 726/27 |
| 2014/0125823 | A1 * | 5/2014 | Johnson ............. H04N 1/00137 348/207.11 |
| 2015/0200918 | A1 | 7/2015 | Khokhar et al. |
| 2015/0222662 | A1 | 8/2015 | Khokhar et al. |

OTHER PUBLICATIONS

"From Snapshots to Social Media—The Changing Picture of Domestic Photography"—Sarvas et al, Springer, Jun. 2012 http://toddstewartphotography.net/teaching/wp-content/uploads/2013/09/10.1007_978-0-85729-247-6.pdf.*

* cited by examiner

*Primary Examiner* — Randy Scott
(74) *Attorney, Agent, or Firm* — Hanrahan Law Firm, P.A.; Benjamin M. Hanrahan (57) ABSTRACT

One embodiment of a source device being able to monitor the premises of a target device before and after permission from the source device is granted to the target device for it to view a data which is currently inaccessible to the target device. The source device is also able to remotely and dynamically deny the target device access to the data after access has been granted, within a reasonable time of viewing an interesting image transmitted from the target device to the source device in correspondence to the premises monitoring process.

12 Claims, 7 Drawing Sheets

REMOTE DATA ACCESS PERMISSION USING REMOTE PREMISES MONITORING

CROSS-REFERENCE TO RELATED APPLICATIONS

This application claims the benefit of non-provisional patent application Ser. No. 14/157,483, filed 2014 Jan. 16 by the present inventors.

This application claims the benefit of non-provisional patent application Ser. No. 14/170,624, filed 2014 Feb. 2 by the present inventors.

BACKGROUND

Prior Art

Current methods for communicating data over a network do not allow a sender of a data, or a source device, the ability to dynamically and remotely monitor the premises where the data is going to be accessed, on a target device, and dynamically alter permission settings as to when the target device may access the data.

In the Remote Data Access Permission with patent application Ser. No. 14/170,624, the source device is given the power to dynamically and remotely allow or deny the target device access to the data. In making the decision whether the target device should be allowed access or not, the source device does not have the ability to take the premises of the target device into consideration. Of the five human senses hearing, smelling, tasting, feeling, and seeing, sight is arguable the most helpful sense in making the decision whether the target device should be permitted access to the data in this case. Ample amount of information can be conveyed visually including but not limited to the ability to see if other unauthorized people are in position to be able to view the data, if another image capturing device is prepared to capture an image of the screen where the data will be displayed, or if the person requesting permission to view the data is the person he or she claims to be.

Assuming the source device is confident that at a present time the premises of the target device is safe for viewing the data and access is granted, the safety of the premises may change. Should the premises at a future time become unsecure after access to the data is granted, the source device will have no knowledge of this since he does not have the ability to monitor the premises while the data is being accessed.

Lastly, should the source device want to abruptly deny the target device access to a data it is currently accessing; under current methods it may not do this. In patent application Ser. No. 14/170,624 the source device has the ability to grant and deny the target device access to the data only before the data is accessed. There is nothing the source device can do to deny access once the target device is granted access. This is especially concerning because ill intentions by the target device can be concealed while asking for access and only shown after it has access to the data.

SUMMARY

In accordance with one embodiment, the Remote Data Access Permission Using Remote Premises Monitoring is a method wherein a source device can monitor the premises of a target device, using image capturing devices on the target device, before and after permission from the source device is granted to the target device for it to view a secured data, and for the source device to be able to dynamically deny the target device access to the data after access has been granted.

Advantages

Accordingly several advantages of one or more aspects are as follows: a source device can monitor the premises of a target device before granting the target device access to a data; the source device can monitor the premises of a target device while the target device has access granted to the data; the source device can revoke or deny a target device access to a data after the source device has granted the target device access to the data within reasonable time of viewing an interesting image during the monitoring process.

DRAWINGS

Figures

DRAWINGS

Reference Numerals

110 source device
112 server
114 target device
116 private key of source device 110
118 public key of source device 110
120 private key of target device 114
122 public key of target device 114
124 a secure data which target device 114 wants to access encoded with a key
126 key needed to decode encoding 124 encoded with public key 118 on server 112

128 imaging subsystem
130 decision processor
132 viewing subsystem
134 positive decision
136 key needed to decode encoding 124 encoded with public key 118 on source device 110
138 public key of target device 114
140 encoding 136 decoded with private key 116, revealing key necessary to decode 124
142 resulting key from 140 encoded with public key 138 on source device 110
144 encoding 142 on server 112
146 encoding 144 on target device 114
148 encoding 146 decoded with private key 120, revealing key
150 encoding 124 decoded with the resulting key from decoding 148, revealing the data
156 positive decision
158 positive decision
160 request from target device 114 to server 112 for encoding 142
162 image snapshot
164 request from server 112 to source device 110 for encoding 142
166 image snapshot
168 request from source device 110 to server 112 for encoding 126
170 response from server 112 to source device 110 with encoding 126
172 request from source device 110 to server 112 for public key 122
174 response from server 112 to source device 110 with public key 122
176 response from source device 110 to server 112 with encoding 142
178 response from server 112 to target device 114 with encoding 144
180 image snapshot
182 image snapshot
184 positive signal
186 positive signal
210 negative decision
212 termination
214 negative signal
216 negative signal
410 negative decision
412 negative signal
414 negative signal
510 user of source device 110
512 request from source device 110 to user 510 for decision
514 positive response
610 negative decision
710 proxy
712 hardware interface
714 image sensor
716 proxy thread
718 request for image snapshot
720 response from target device 110 to application 710 with image snapshot
810 decision processor
812 screen of source device 110
814 proxy
816 request for decision
818 positive decision
820 negative decision
822 image snapshot

DETAILED DESCRIPTION

Figure 1A:
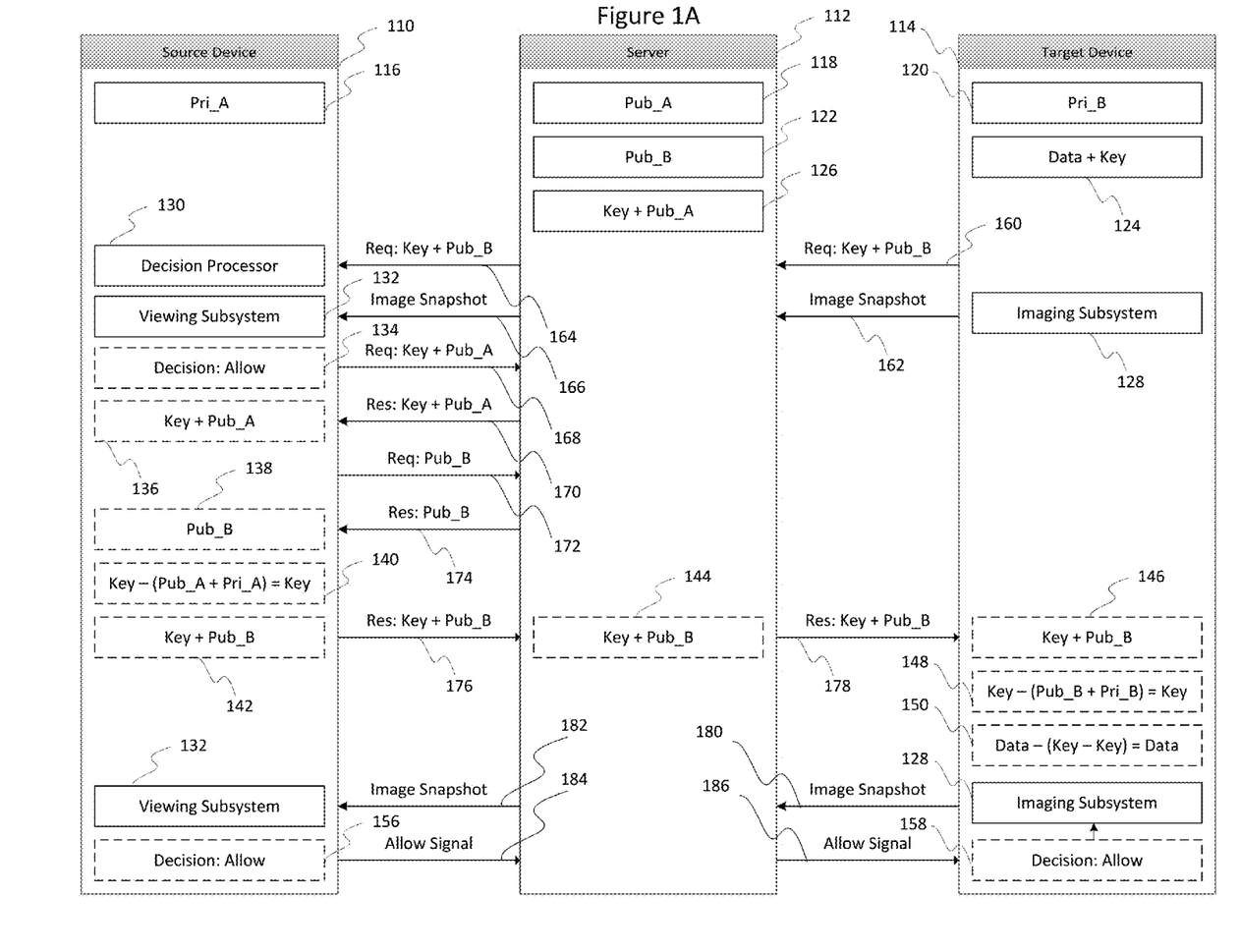
FIG. 1A illustrates an example flow diagram of a source device allowing a target device access to a data while taking advantage of a remote premises monitoring process, incorporated into the old workflow.

FIG. 1A—First Embodiment

One embodiment of a source device allowing a target device access to a data while taking advantage of a remote premises monitoring process, incorporated into the old workflow is shown in FIG. 1A. When the target device 114 transmits request 160, it also sends a snapshot 162 of the premises. Snapshot 162 is taken by an imaging subsystem 128 and a detail of its process is described in detail in FIG. 4 of this patent. The source device 110 receives snapshot 166 at viewing subsystem 132. Viewing subsystem 132 transmits snapshot 166 to the screen 812 (shown in FIG. 5) of the source device 110 in order to allow user 510 (shown in FIG. 5) to view the premises of target device 114. The process of viewing subsystem 132 is described in detail in FIG. 5 of this patent. The viewing subsystem 132 will also be discussed in detail later. The user 510 (shown in FIG. 5) can now decide whether to allow or deny target device 114 accesses to encrypted data 124 based on the viewing of snapshot 166, which informs user 510 (shown in FIG. 5) of the premises of target device 114. The request, response, and processing of the positive decision is described in detail in FIG. 3A of this patent. A positive decision 134 results in a workflow execution similar to the old patent which results in the encoded data 124 made accessible for the target device 114. After the data is made accessible to target device 114 at decoding 150, the imaging subsystem 128 activates again. It continuously transmits snapshots of the premises to the viewing subsystem 132 on source device 110. Source device 110 then transmits the snapshots to the screen of the source device for viewing by the user, as described in FIG. 5. The user can then respond with a positive or negative decision which is transmitted to target device 114 and eventually imaging subsystem 128. The decoded data will only remain accessible to the target device 114 if positive signals are received from the source device 110. The unencrypted data is purged once no more positive decisions are received by the imaging subsystem 128 or if a negative decision is received by imaging subsystem 128. The termination by method of received a negative decision is shown in FIG. 1B.

DETAILED DESCRIPTION

Figure 1B:
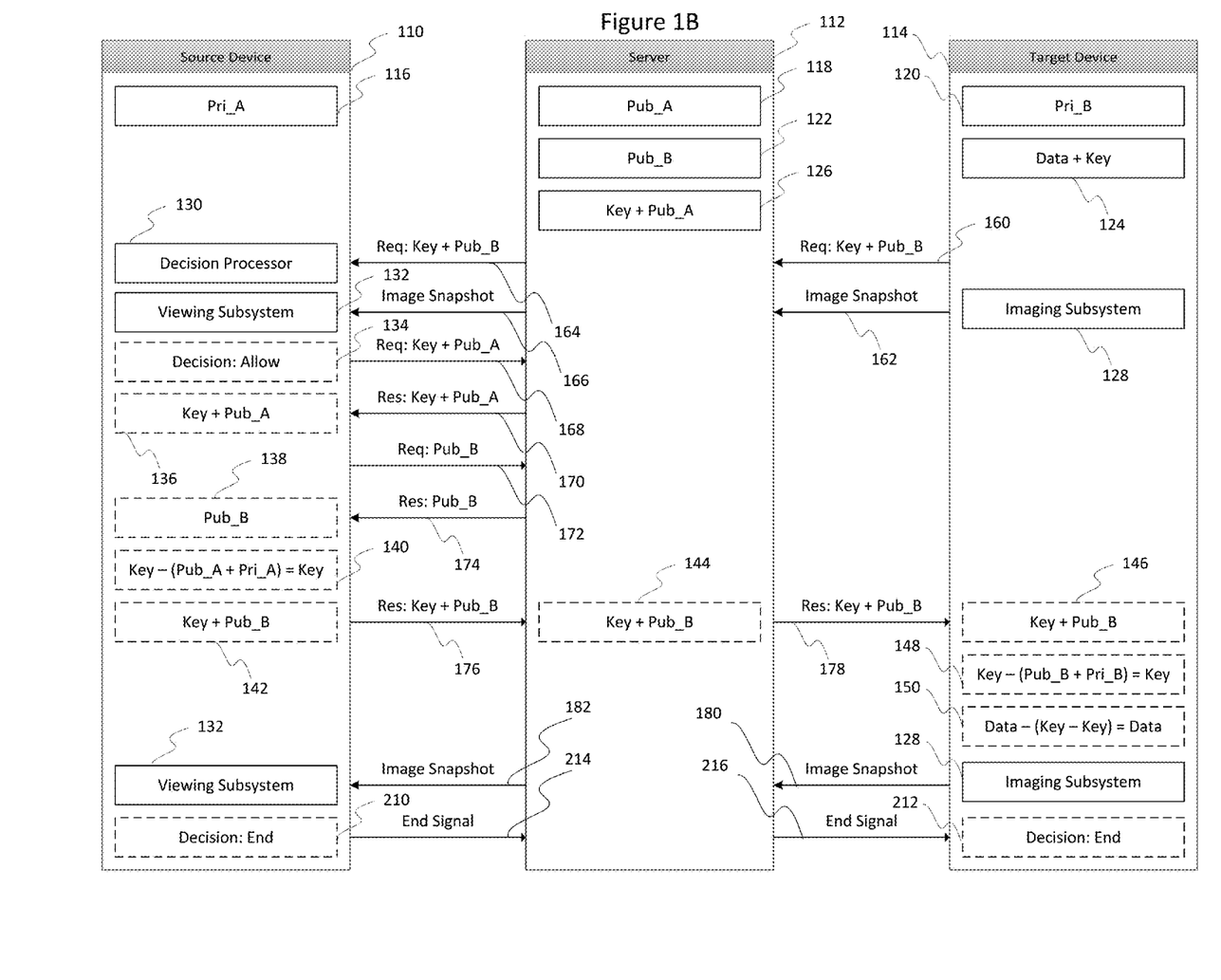
FIG. 1B illustrates an example flow diagram of a source device restricting a target device access to a data during the execution of a remote premises monitoring process shown in FIG. 1A.

FIG. 1B—First Embodiment

One embodiment of a source device restricting a target device access to a data during the execution of a remote premises monitoring process described in FIG. 1A is shown in FIG. 1B. This diagram closely resembles FIG. 1A of this patent with the modification that a negative decision is generated by the user at 210. The generation of the negative decision 210 is show in detail in FIG. 3B. As described in Detailed Description-FIG. 1A, one the negative decision is received by imaging system 128, the process terminates and the data is made inaccessible again.

DETAILED DESCRIPTION

Figure 2:
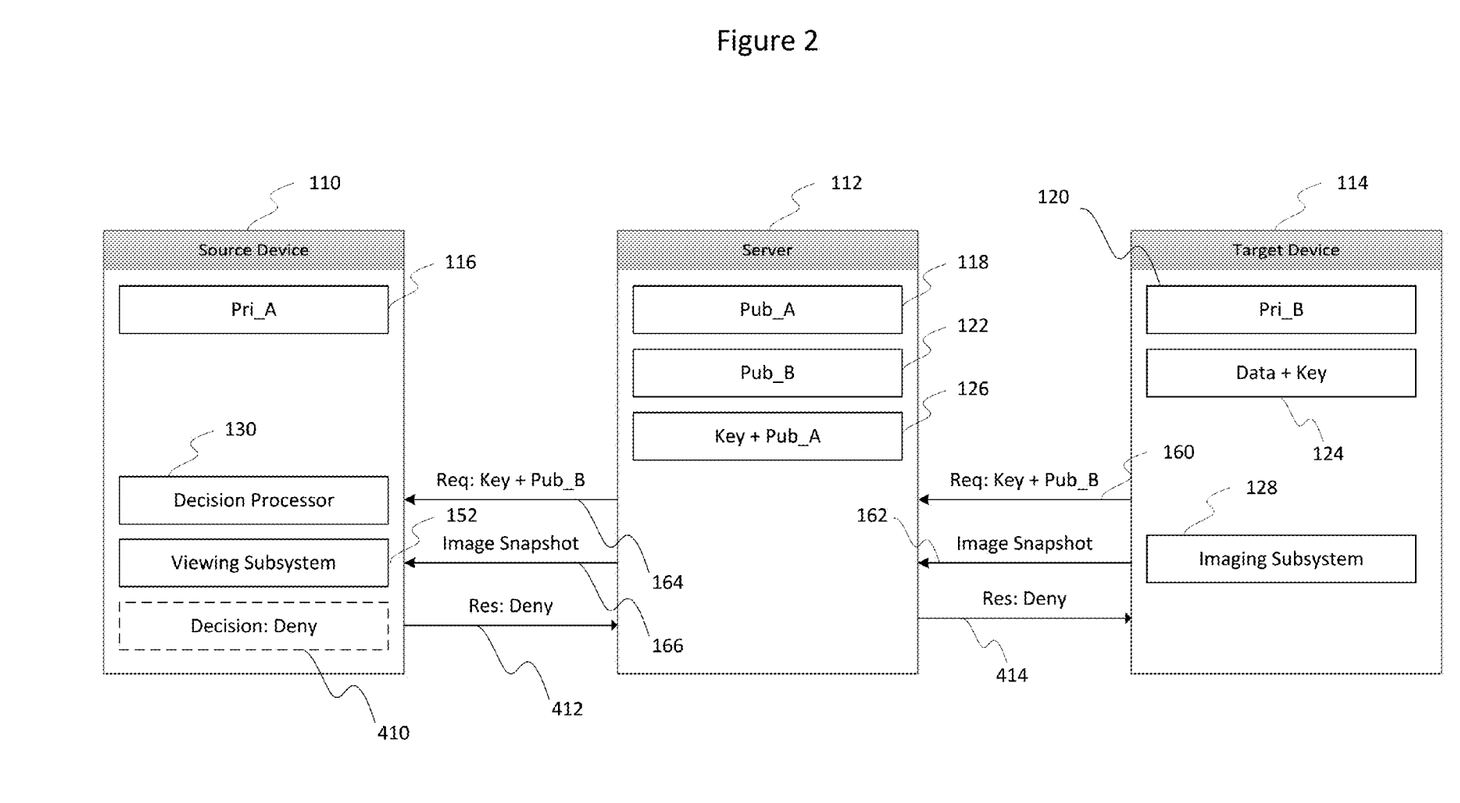
FIG. 2 illustrates an example flow diagram of a source device restricting a target device access to a data in the early stages of FIG. 1A, while still taking advantage of some parts of a remote premises monitoring process.

FIG. 2—First Embodiment

One embodiment of a source device restricting a target device access to a data in the early stages of FIG. 1A, while still taking advantage of some parts of a remote premises monitoring process is shown in FIG. 2. This workflow begins execution similarly to previous FIGS. 1A and 1B with the exception that a negative decision 410 is received in the early stages of the workflow. The transmission of a negative response is shown in detail in FIG. 3B. Negative decision 410 terminates the workflow by returning a negative response to target device 114. The advantage here is that the source device 110 has preliminary information about the premises of the target device 114 in the form of image snapshot 166 before a negative decision 410 is made.

DETAILED DESCRIPTION

Figure 3A:
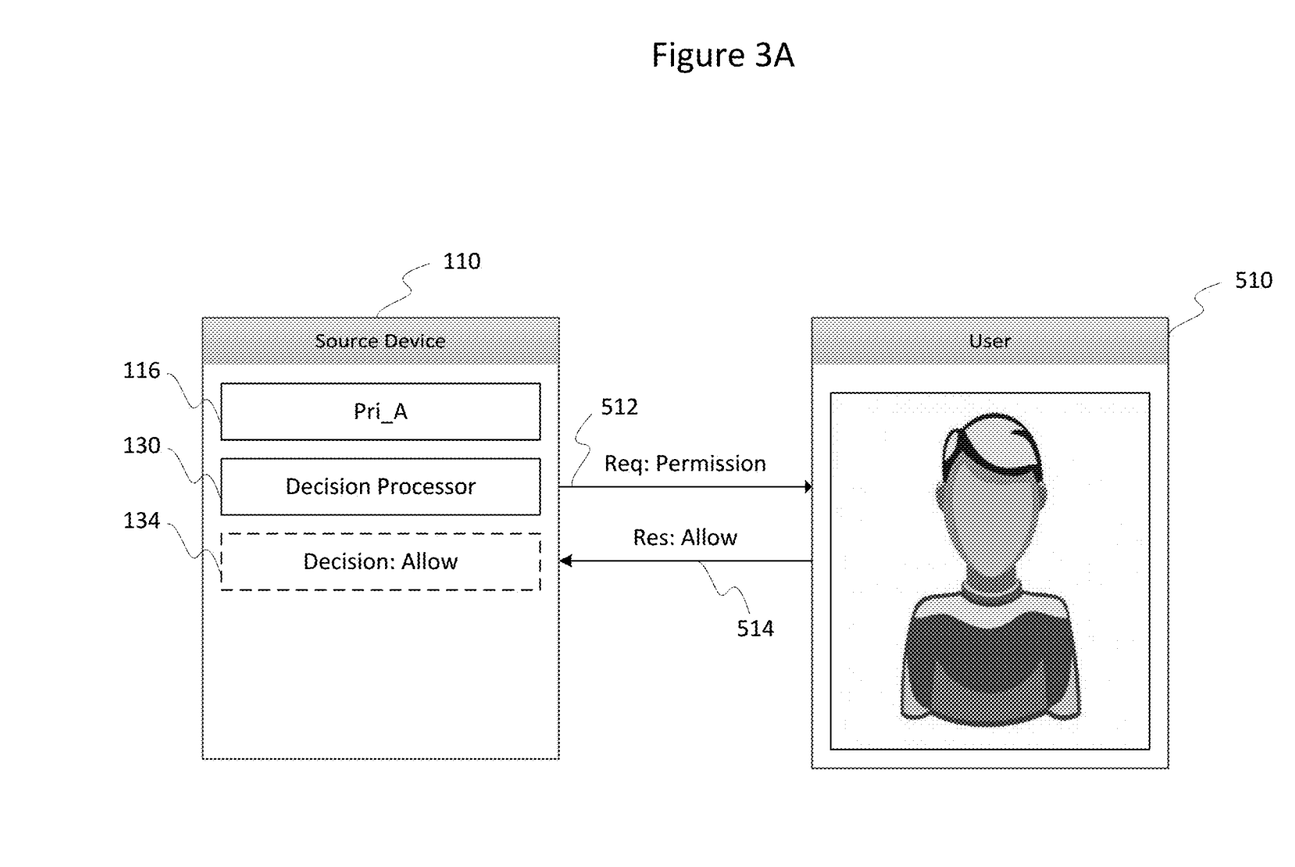
FIG. 3A illustrates an example flow diagram of a user providing a positive response to a decision request from a decision processor. This design is used in the following diagrams where a decision processor is present: 1A, 1B, 2, and 5. Note that FIG. 3B is not named because it shows a negative response returned by the user.

FIG. 3A—First Embodiment

One embodiment of a user providing a positive response to a decision request from a decision processor is shown in FIG. 3A. This Figure is similar to FIG. 2 of the old patent (Ser. No. 14/170,624). The decision processor 130 asks the user 510 for a positive or negative decision and calculates whether the response of the user is positive or negative and acts accordingly. The action for a positive decision 134 is described in the previous description 1A.

DETAILED DESCRIPTION

Figure 3B:
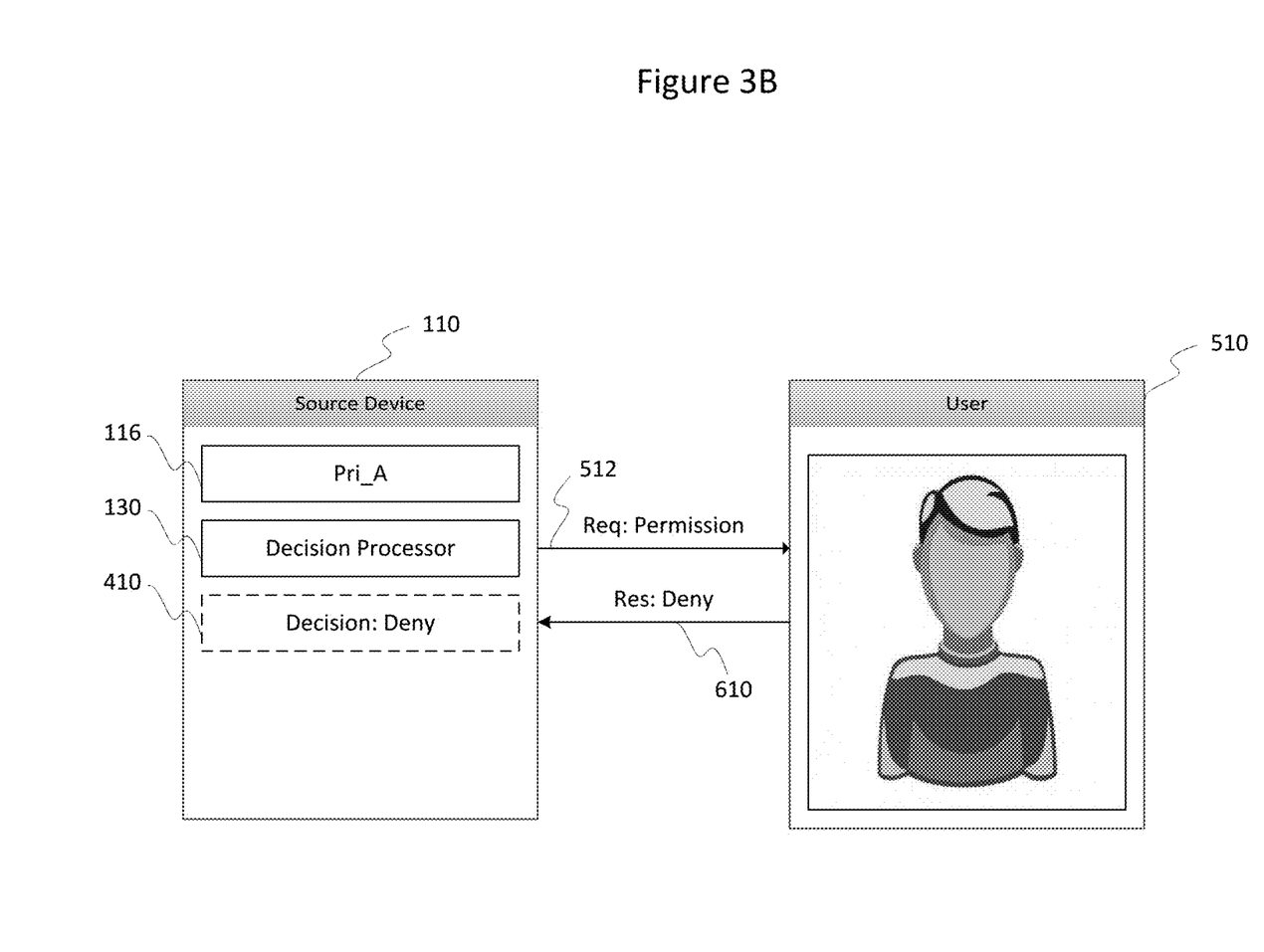
FIG. 3B illustrates an example flow diagram of a user providing a negative response to a decision request from a decision processor. This design is used in the following diagrams where a decision processor is present: 1A, 1B, 2, and 5. Note that FIG. 3B is not named because it shows a negative response returned by the user.

FIG. 3B—First Embodiment

One embodiment of a user providing a negative response to a decision request from a decision processor is shown in FIG. 3B. This Figure is similar to FIG. 4 of the old patent (Ser. No. 14/170,624). The decision processor 130 asks the user 510 for a positive or negative decision and calculates whether the response of the user is positive or negative and acts accordingly. The action for a negative decision 410 is described in the previous description 2A.

DETAILED DESCRIPTION

Figure 4:
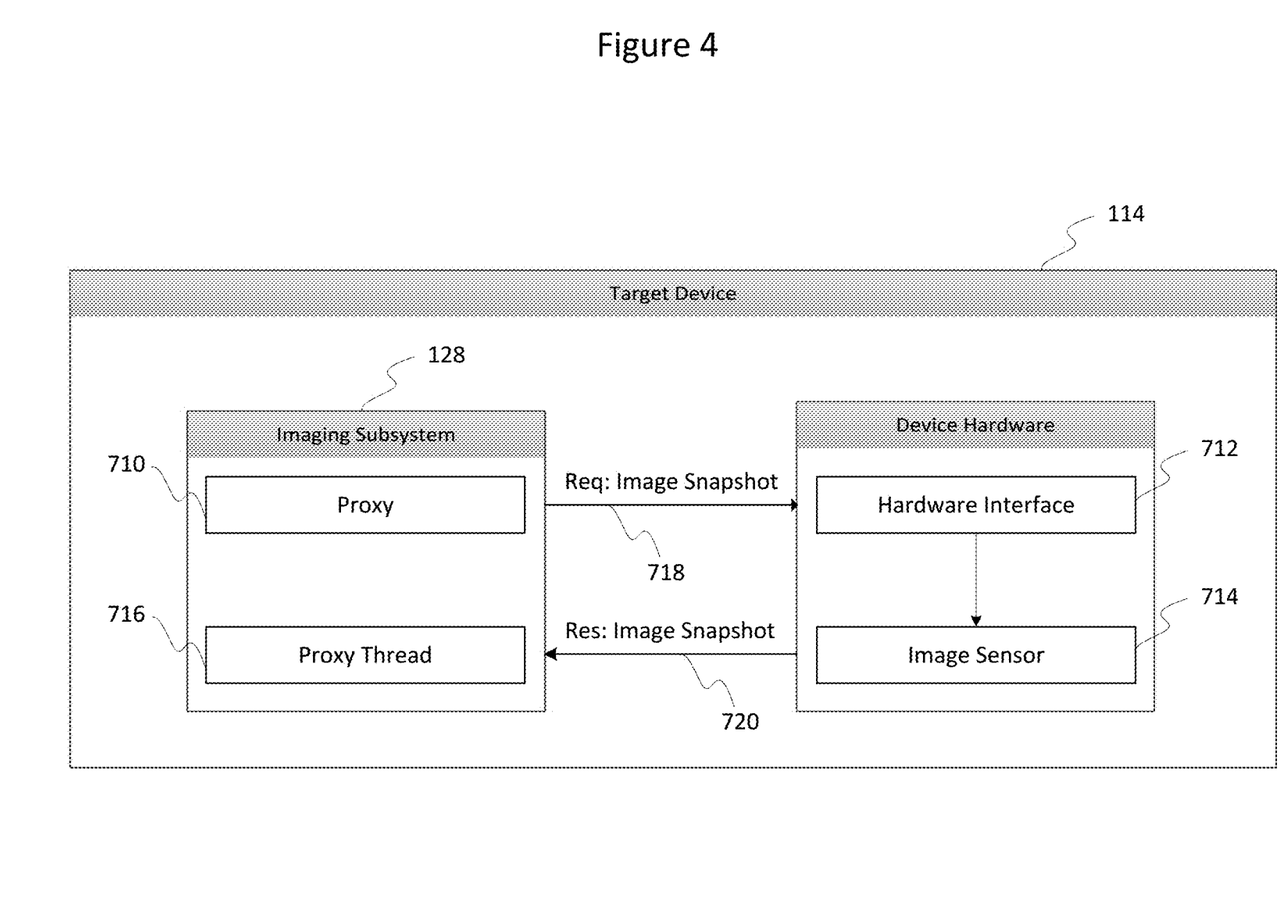
FIG. 4 illustrates an example flow diagram of an imaging subsystem interacting with the software and hardware of the device in order to obtain an image snapshot of the premises of the target device.

FIG. 4—First Embodiment

One embodiment of an imaging subsystem interacting with the software and hardware of the device in order to obtain an image snapshot of the premises of the target device is shown in FIG. 4. The proxy 710 which is part of the imaging subsystem 128 gives the proxy the authority to access the hardware interface 712, which is required to be on the target device 114. Hardware interface 712 is instructed by proxy 710 to access the image sensor 714 and instruct the image sensor 714 to take an image snapshot of the premises. The image snapshot is then transmitted back to the imaging subsystem 128 to proxy thread 716 through transmission 720.

DETAILED DESCRIPTION

Figure 5:
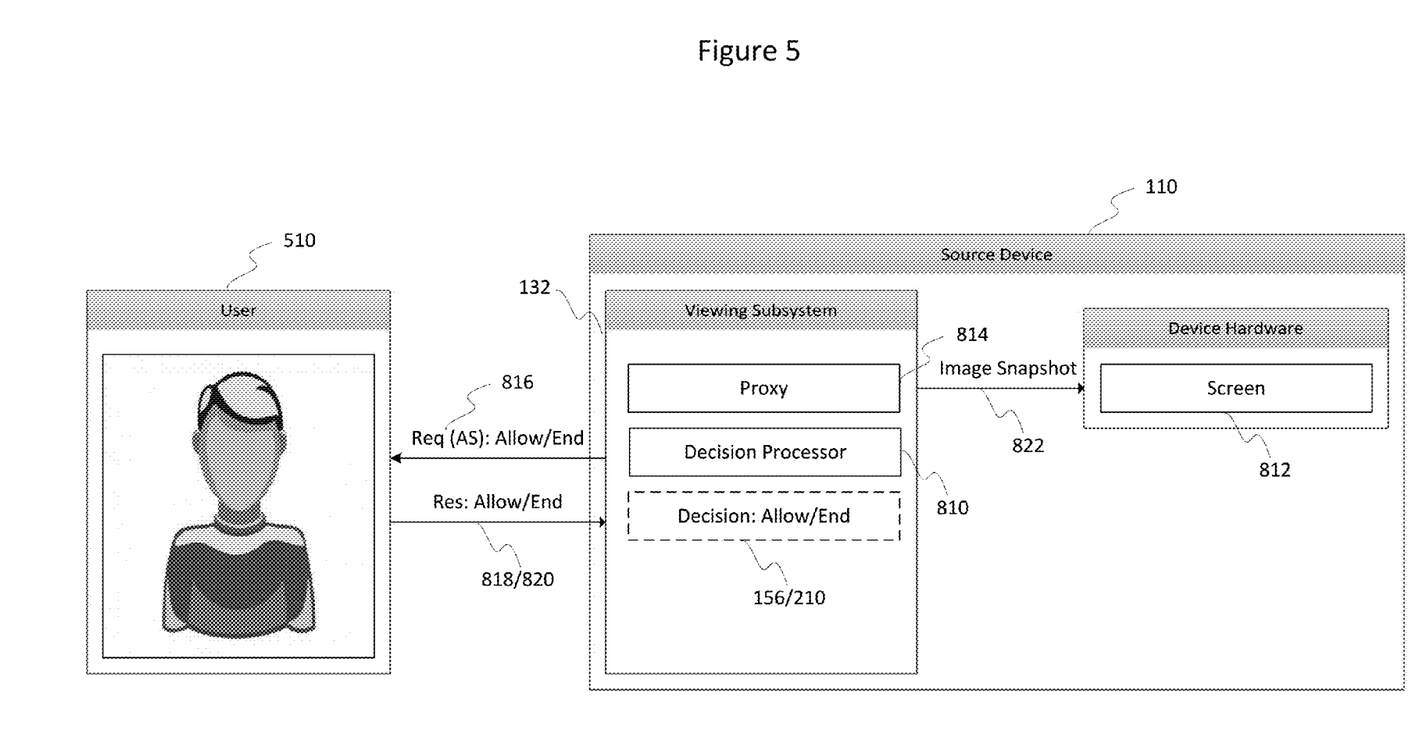
FIG. 5 illustrates an example flow diagram of a viewing subsystem displaying an image snapshot on the source device and taking input from the user in order to decide whether to continue allowing the target device access to a data.

FIG. 5—First Embodiment

One embodiment of a viewing subsystem displaying an image snapshot on the source device and taking input from the user in order to decide whether to continue allowing the target device access to a data is shown in FIG. 5. The proxy 814 which is part of the viewing subsystem 132 receives the snapshot and outputs it to screen 812 of source device 110. The decision processor 810 then acts similarly to previous decision processor 130 wherein it asks the user 510 for a positive 818 or negative 820 decision and processes his response.

Operation—FIG. 1A

Target device 114 first requests encoding 142, show on FIG. 1A of this patent, from server 112 by transmitting request 160 and image snapshot 162. Server 112 receives request 160 and image snapshot 162 then transmits request 164 and image snapshot 166 to source device 110. Source device 110 receives request 164 and image snapshot 166. The viewing subsystem 132 processes image 166, described in detail in FIG. 5. The decision processor 130 then processes whether it should allow or deny request 164, described in FIGS. 3A and 3B. A positive decision is received at 134 and identified as positive by decision processor 130, there for, source device 110 responds by transmitting request 168 to server 112 for encoding 126. Server 112 receives request 168 and responds with response 170. Source device 110 receives response 170 at 136. Source device 110 then transmits request 172 to server 112 for public key 122. Server 112 responds to request 172 with response 174. Source device 110 receives response 174 at location 138. Encoding 136 is decoded at 140 using private key 116, resulting in a key. Source device 110 encodes the key result of decoding 140 with public key 138. Source device 110 transmits encoding 142 to server 112 through response 176, in accordance to the original request 164. Server 112 receives response 176 at 144. Server 112 transmits encoding 144 to target device 114 through response 178, in accordance to request 160. Target device 114 receives transmission 178 at 146. Target device 114 decodes encoding 146 with private key 120 at decoding 148, resulting in the same key from decoding 140. Target device 114 uses the resulting key, from decoding 148, to decode encoding 124 at 150, resulting in the accessible data. Imaging subsystem 128 then begins processing data and continuously transmits snapshots 180 to the server 112 which are then transmitted to source device 110 through transmission 182. Viewing subsystem 132 continuously processes snapshots 182 as they are received. As allow decisions are generated, described in detail in FIG. 5 of this patent, positive signals 184 are continuously transmitted to server 112 which are then transmitted to target device 114 through transmission 186. Positive signals 186 are received at 158 and transmitted to imaging subsystem 128 resulting in the next iteration of this cycle.

Operation—FIG. 1B

Target device 114 first requests encoding 142, show on FIG. 1A of this patent, from server 112 by transmitting request 160 and image snapshot 162. Server 112 receives request 160 and image snapshot 162 then transmits request 164 and image snapshot 166 to source device 110. Source device 110 receives request 164 and image snapshot 166. The viewing subsystem 132 processes image 166, described in detail in FIG. 5. The decision processor 130 then processes whether it should allow or deny request 164, described in FIGS. 3A and 3B. A positive decision is received at 134 and identified as positive by decision processor 130, there for, source device 110 responds by transmitting request 168 to server 112 for encoding 126. Server 112 receives request 168 and responds with response 170. Source device 110 receives response 170 at 136. Source device 110 then transmits request 172 to server 112 for public key 122. Server 112 responds to request 172 with response 174. Source device 110 receives response 174 at location 138. Encoding 136 is decoded at 140 using private key 116, resulting in a key. Source device 110 encodes the key result of decoding 140 with public key 138. Source device 110 transmits encoding 142 to server 112 through response 176, in accordance to the original request 164. Server 112 receives response 176 at 144. Server 112 transmits encoding 144 to target device 114 through response 178, in accordance to request 160. Target device 114 receives transmission 178 at 146. Target device 114 decodes encoding 146 with private key 120 at decoding 148, resulting in the same key resulting from decoding 140. Target device 114 uses the resulting key, from decoding 148, to decode encoding 124 at 150, resulting in the accessible data. Imaging subsystem 128 then begins processing data and continuously transmits snapshots 180 to the server 112 which are then transmitted to source device 110 through transmission 182. Viewing subsystem 132 continuously processes snapshots 182 as they are received. Once negative decision 210 is generated, described in detail in FIG. 4 of this patent, negative signal 214 is transmitted to server 112 which is then transmitted to target device 114 through transmission 216. Negative signal 212 is received at 212 and transmitted to imaging subsystem 128 resulting in the termination of this loop as described in FIG. 1A of this patent and the accessible data from decoding 150 is purged.

Operation—FIG. 2

Target device 114 first requests encoding 142, show on FIG. 1A of this patent, from server 112 by transmitting request 160 and image snapshot 162. Server 112 receives request 160 and image snapshot 162 then transmits request 164 and image snapshot 166 to source device 110. Source device 110 receives request 164 and image snapshot 166. The viewing subsystem 132 processes image 166, described in detail in FIG. 5. The decision processor 130 then processes whether it should allow or deny request 164, described in FIGS. 3A and 3B. A negative decision is received at 410 and source device 110 responds by transmitting negative response 412 to server 112. Server 112 then transmits negative response 414 to target device 114 which ends the process, resulting in target device 114 not being able to access the encoded data.

Operation—FIG. 3A

The decision processor 130 transmits request 512 to user 510. The user 510 is notified of request 512 and is given two options, to allow or to deny. The user 510 selects to allow and positive response 514 is generated and transmitted back to source device 110. Response 514 is received at 134 and is given to the decision processor for analysis in order to see whether it is a positive or negative decision.

Operation—FIG. 3B

The decision processor 130 transmits request 512 to user 510. The user 510 is notified of request 512 and is given two options, to allow or to deny. The user 510 selects to deny and negative response 610 is generated and transmitted back to source device 110. Response 610 is received at 410 and is given to the decision processor for analysis in order to see whether it is a positive or negative decision.

Operation—FIG. 4

Proxy 710 requests image snapshot 718 from the hardware interface 712 already mounted on target device 114. Hardware interface 712 actualized image sensor 714 to take the image snapshot. Image sensor 714 then responds to request 718 with snapshot 720. Snapshot 720 is received by proxy thread 716.

Operation—FIG. 5

Proxy 814 transmits image snapshot 166, from FIG. 1A of this patent, to screen 812 using transmission 822. The decision processor 810 transmits request 816 to user 510. The user 510 is notified of request 816 and is given two options, to allow or to deny. If the user 510 selects to allow, positive response 818 is generated and transmitted back to viewing subsystem 132. If the user 510, on the other hand, selects to deny, negative response 820 is generated and transmitted back to viewing subsystem 132. Either positive response 818 or negative response 820 is received at decision 156 or decision 210 respectively and is given to the decision processor for analysis in order to see whether it is a positive or negative decision.

CONCLUSION, RAMIFICATIONS, AND SCOPE

Thus the reader will see that at least one embodiment of the system where a source device is able to monitor the premises of a target device, before and after permission from the source device is granted to the target device for it to view a data which is currently inaccessible to the target device, and where the source device is also able to remotely and dynamically deny the target device access to the data after access has been granted, within a reasonable time of viewing an interesting image transmitted from the target device to the source device in correspondence to the premises monitoring process.

While my above description contains many specificities, these should not be construed as limitations on the scope, but rather as an exemplification of one embodiment thereof. Many other variations are possible. For example, other means may be used capturing premises image data on the target device. Also, other means may be used to display the captured image data on the target device for the user to see. Also, alternative means may be used to alert the target device when the source device wishes to stop the target device from accessing the data.

Accordingly, the scope should be determined not by the embodiment illustrated, but by the appended claims and their legal equivalents.

We claim:

1. A method for remote data access permission control, the method requiring a target device to generate real-time visual information about its physical premises prior to obtaining access to data which would otherwise be inaccessible data, the method comprising:
    processing a request from the target device to access the inaccessible data,
    capturing an image snapshot using an image capturing device of the target device, the image snapshot comprising a visual representation of the physical premises at the target device,
    wherein processing the request from the target device to access the inaccessible data and capturing the image snapshot using the image capturing device of the target device comprises:
        engaging a proxy process on the target device; the proxy process engaging a hardware interface on the target device; the hardware interface engaging the image capturing device on the target device to capture the image snapshot; and
        delivering the image snapshot to a proxy thread for transmission to the source device,
    transmitting the image snapshot to the source device, and
    displaying the image snapshot on the source device for visual review thereof by a user of the source device.

2. The method as recited in claim 1 further comprising defining the image snapshot as comprising a real-time photographic image of at least a portion of the physical environment where the target device is located.

3. The method as recited in claim 2 further comprising defining the image snapshot as comprising a visual representation of the physical premises external to the target device.

4. The method as recited in claim 1 further comprising defining the image snapshot as comprising a visual image of a user located at the target device.

5. A method for remote data access permission control, the method comprising:
- receiving a request from a target device to access data, wherein access to the data is at least partially controlled remotely by a source device,
- prior to granting access to the data, capturing an image snapshot using an image capturing device of the target device, the image snapshot comprising a real-time visual representation of the physical environment at the target device,
- transmitting the image snapshot to the source device,
- displaying the image snapshot on the source device for visual review thereof by a user of the source device, and
- receiving an access control command from a user at the source device, the access control command comprising a grant command to at least temporarily grant access to the data at the target device, or a deny command to at least temporarily deny access to the data at the target device.

6. The method as recited in claim 5 further comprising defining the image snapshot as comprising a real-time photographic image of at least a portion of the physical environment where the target device is located.

7. The method as recited in claim 5 further comprising defining the image snapshot as further comprising a visual image of a user located at the target device.

8. The method as recited in claim 5 further comprising defining the image snapshot as comprising a real-time visual representation of the physical environment at and external to the target device.

9. The method as recited in claim 5 further comprising:
- while access is granted to the data:
  - capturing at least one additional image snapshot using the image capturing device of the target device, the at least one additional image snapshot comprising a real-time visual representation of the physical environment at the target device,
  - transmitting the at least one additional image snapshot to the source device,
  - displaying the at least one additional image snapshot on the source device for visual review thereof by the user of the source device, and
  - receiving an additional access control command from the user at the source device, the additional access control command comprising a grant command to at least temporarily continue to grant access to the data at the target device, or a deny command to at least temporarily deny access to the data at the target device.

10. A method for remote data access permission control, the method requiring a target device to generate real-time visual information about its physical premises prior to obtaining access to data which would otherwise be inaccessible data, the method comprising:
- processing a request from the target device to access the inaccessible data,
- capturing an image snapshot using an image capturing device of the target device, the image snapshot comprising a visual representation of the physical premises at the target device,
- wherein processing the request from the target device to access the inaccessible data and capturing the image snapshot using the image capturing device of the target device comprises:
  - transmitting a message to the target device; the message resulting in engagement of a proxy process on the target device; the proxy process engaging a hardware interface on the target device; the hardware interface engaging the image capturing device on the target device to capture the image snapshot; and
  - delivering the image snapshot to a proxy thread for transmission to the source device,
- transmitting the image snapshot to the source device, and
- displaying the image snapshot on the source device for visual review thereof by a user of the source device.

11. A method for remote data access permission control, the method requiring a target device to generate real-time visual information about its physical premises prior to obtaining access to data which would otherwise be inaccessible data, the method comprising:
- processing a request from the target device to access the inaccessible data,
- capturing an image snapshot using an image capturing device of the target device, the image snapshot comprising a visual representation of the physical premises at the target device,
- transmitting the image snapshot to the source device,
- displaying the image snapshot on the source device for visual review thereof by a user of the source device, and
- in response to the request from the target device to access the inaccessible data, receiving an access control command from the source device to grant or deny access to the data.

12. The method as recited in claim 11 further comprising controlling the target device's access to the data in real-time based upon the access control command received from the source device.

* * * * *